United States Patent
Schlaphoff

[15] 3,666,293
[45] May 30, 1972

[54] PORTABLE MOTOR VEHICLE

[72] Inventor: Erwin D. Schlaphoff, 967 Charter Drive, Covina, Calif. 91722

[22] Filed: Dec. 8, 1969

[21] Appl. No.: 883,264

Related U.S. Application Data

[62] Division of Ser. No. 695,111, Jan. 2, 1968, Pat. No. 3,548,963.

[52] U.S. Cl..............................280/278, 280/279, 280/37
[51] Int. Cl.................................................B62k 21/18
[58] Field of Search..............280/278, 279, 287, 87.05, 37; 74/551.1–551.7, 547; 287/58 CT, 103 A

[56] References Cited

UNITED STATES PATENTS

| | | | |
|---|---|---|---|
| 1,951,754 | 3/1934 | Gilbert | 287/58 CT |
| 2,483,396 | 10/1949 | Benson | 287/58 CT |
| 231,609 | 8/1880 | Perkins | 74/551.1 |
| 560,700 | 5/1896 | Fisher | 74/551.4 |
| 740,037 | 9/1903 | Olinger | 287/103 A |
| 2,910,130 | 10/1959 | Schlaphoff | 280/287 X |
| 3,354,975 | 11/1967 | Stuart | 280/278 X |

FOREIGN PATENTS OR APPLICATIONS

| | | | |
|---|---|---|---|
| 1,439,508 | 4/1966 | France | 280/287 |

*Primary Examiner*—Kenneth H. Betts
*Attorney*—Warren H. F. Schmieding

[57] ABSTRACT

A portable motor vehicle that includes a front frame that carries a vertically extending bearing for a spindle. A front wheel is journaled on the spindle. Handle bars are connectable to a head of the spindle for turning the spindle and can be disconnected and moved downwardly without removing the same from the head of the spindle.

8 Claims, 11 Drawing Figures

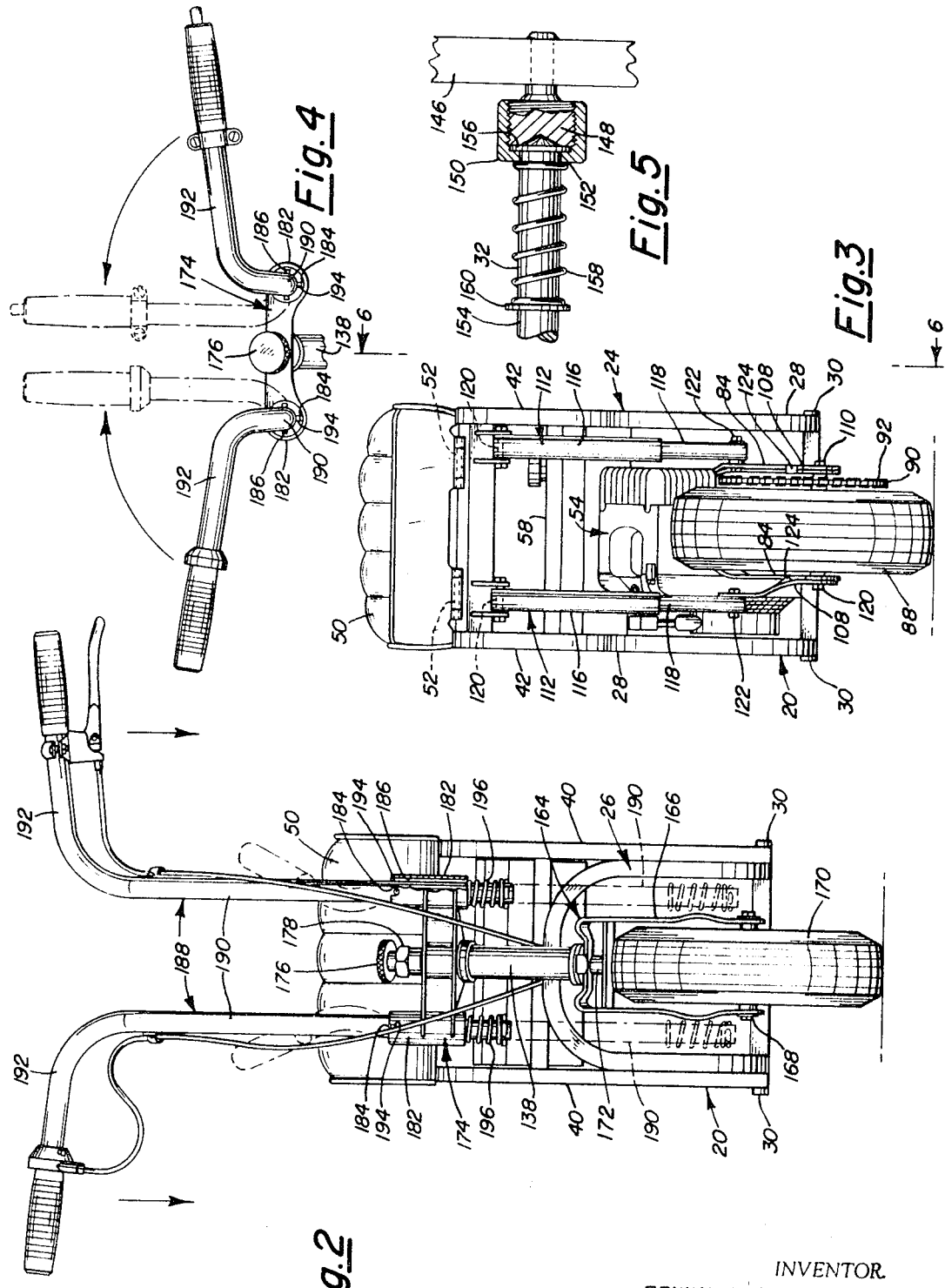

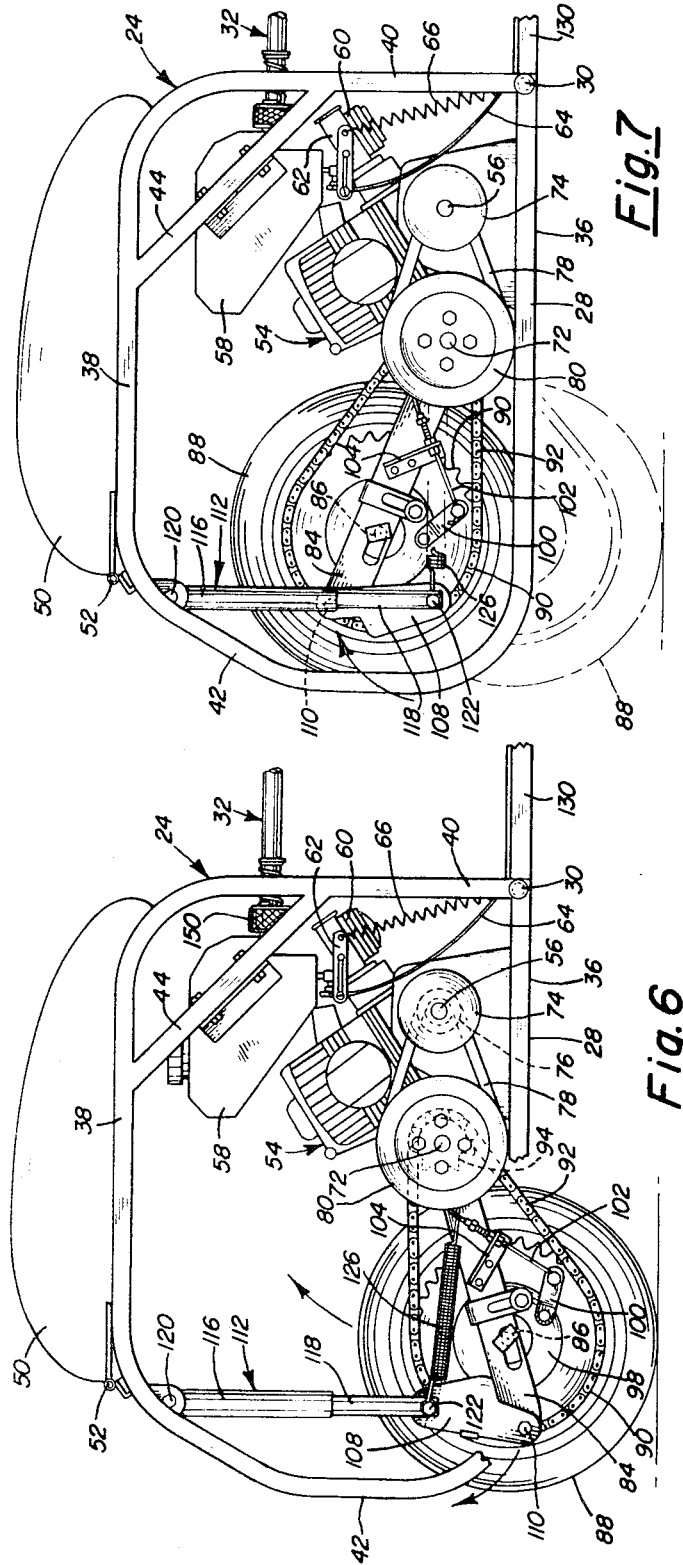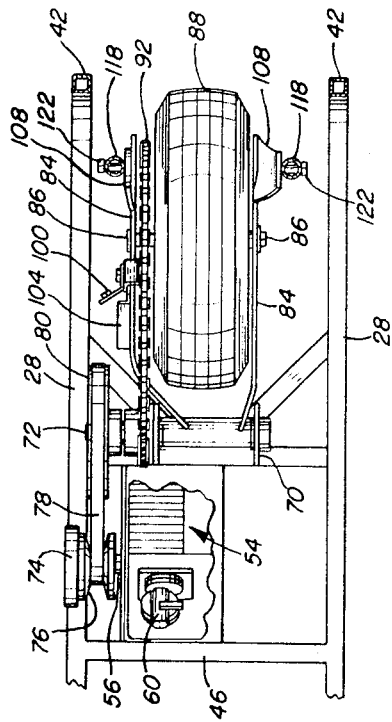

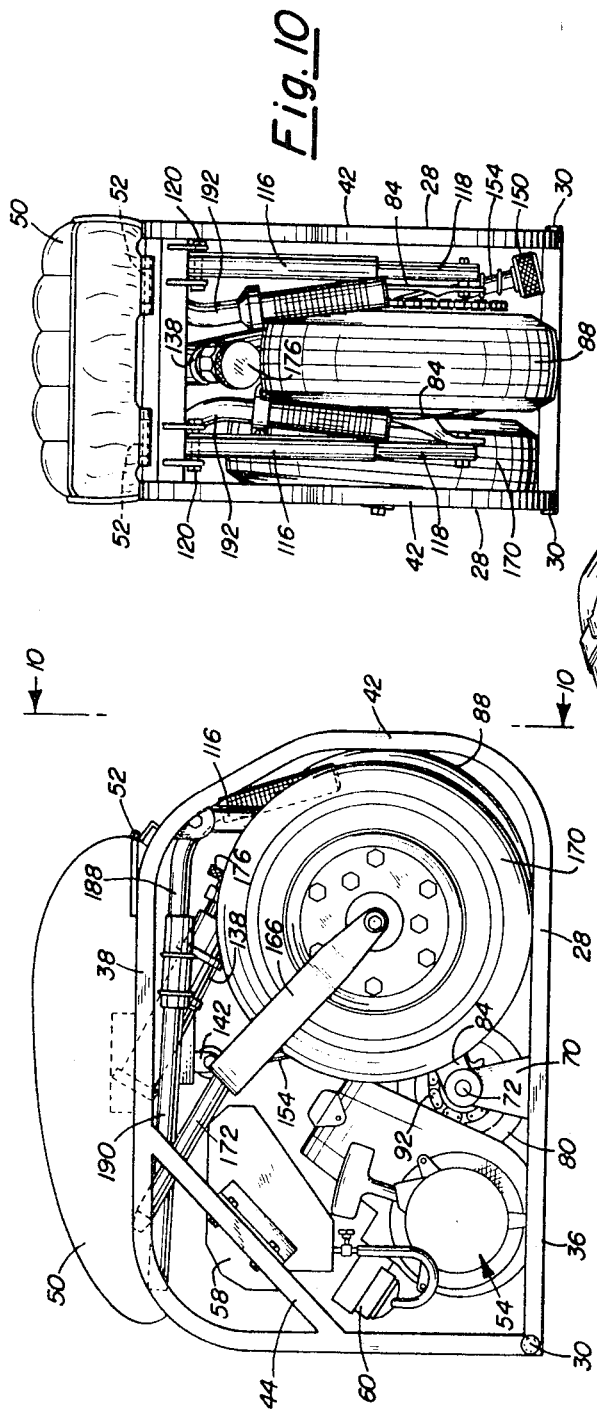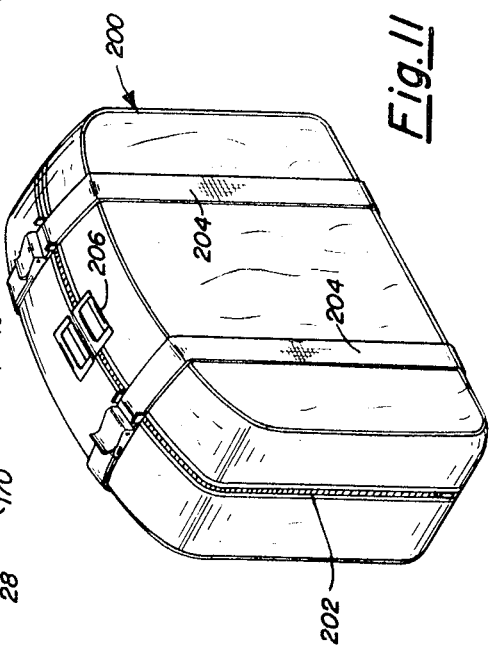
INVENTOR.
ERWIN D. SCHLAPHOFF

PORTABLE MOTOR VEHICLE

CROSS-REFERENCE TO RELATED APPLICATIONS

This application is a division of my copending application, Ser. No. 695,111 filed Jan. 2, 1968, now U.S. Pat. No. 3,548,963.

BACKGROUND OF THE INVENTION

1. Field of the Invention

The invention is directed to compact motor vehicles of the type which can be collapsed and stored as a compacted unit.

2. Description of the Prior Art

The most pertinent prior art known to me are the structures shown in my U.S. Pat. No. 2,696,272 issued Dec. 7, 1954 and No. 2,910,130 issued Oct. 27, 1959. The present invention provides a sturdier front frame and steering mechanism and provides for further compacting of the steering mechanism.

SUMMARY OF THE INVENTION

The portable motor vehicle includes front and rear frames which are detachably connected with one another. The front fame, the front wheel and the steering mechanism therefor can be confined in the rear frame when it is desirable to ship or transport the vehicle in confined status. A head is removably attached to the wheel spindle. This head is provided preferably with two sleeves, each of which receives a handle bar. Each sleeve is provided with a socket for receiving a pin which is fixed to the respective handle bar. The pins are held in the sockets by spring. Each sleeve is provided with a longitudinally extending groove through which the pins can extend after being removed from the sockets whereby the handle bars can be shifted to a compacted position relative to the head.

Other features and the advantages of the present invention will be apparent from the following description, reference being had to the accompanying drawings wherein a preferred embodiment of the invention is illustrated.

BRIEF DESCRIPTION OF THE DRAWINGS

FIG. 2 is a front view of the vehicle;

FIG. 3 is a rear view of the vehicle;

FIG. 4 is a top plan view of the handle bars and the sleeves of the front frame;

FIG. 5 is a fragmentary sectional view taken along line 5—5 of FIG. 1, but on a larger scale;

FIG. 6 is a right side view of the rear section of the vehicle, part of the frame being removed, and also showing the lower section of the front frame and part of the stabilizing connection between the front and rear frames;

FIG. 7 is a view similar to FIG. 6, but showing the bottom of the rear frame lowered to ground engagement;

FIG. 8 is a fragmentary view looking in the direction of arrows 8 in FIG. 1, the upright portion of the rear frame being shown in section;

FIG. 9 is a left side view of the vehicle, but showing the front section confined in the rear section;

FIG. 10 is a view looking in the direction of arrows 10 of FIG. 9; and

FIG. 11 is a perspective view of the carrying case for the vehicle.

DESCRIPTION OF THE PREFERRED EMBODIMENTS

Figure 1:
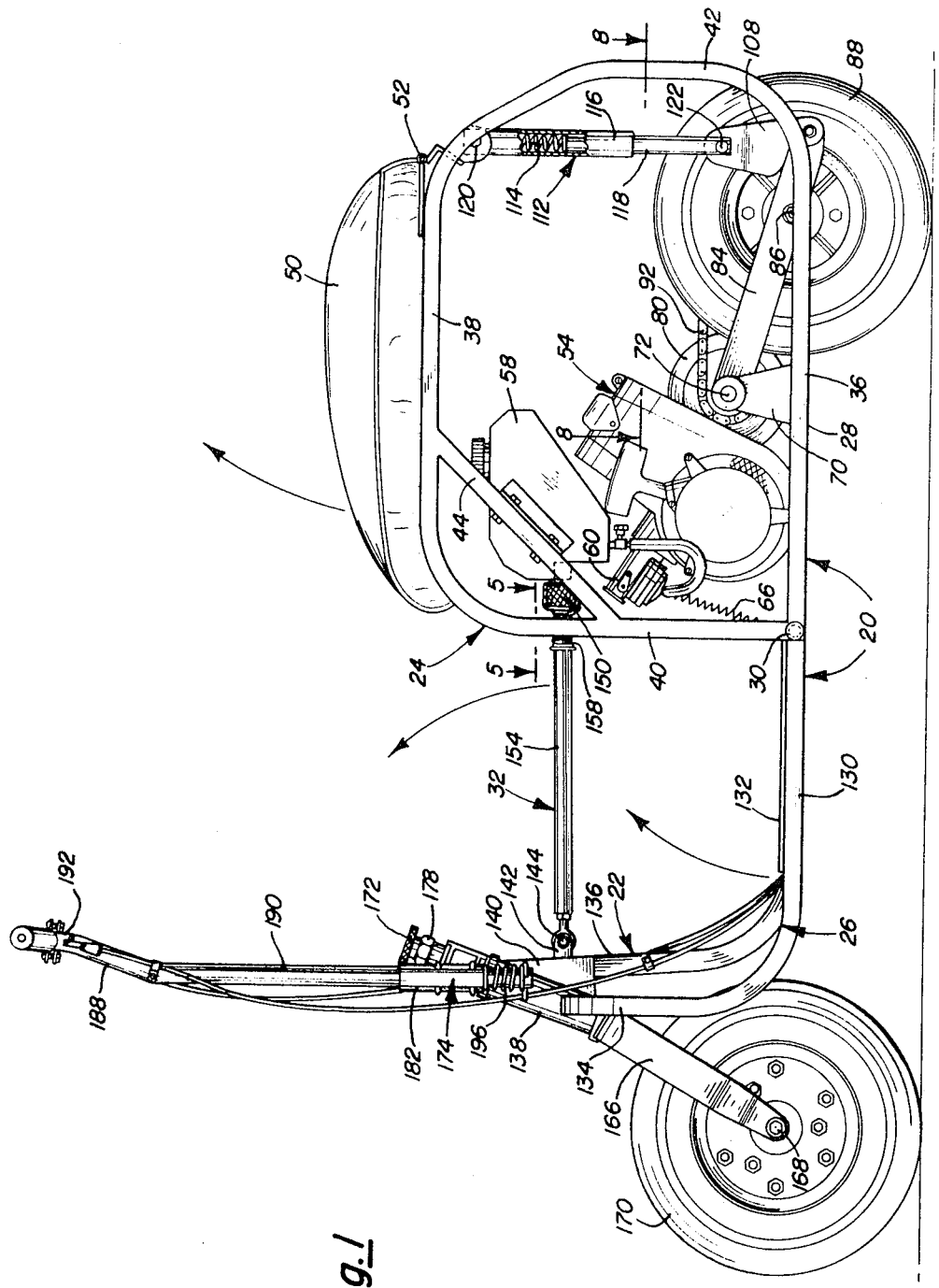
FIG. 1 is a left side view of the portable motor-vehicle, part of the spring guide being shown in section.

Referring more in detail to the drawings, the portable motor vehicle 20 includes a front section 22 and rear section 24. The front section includes a main frame 26 and the rear section includes a main frame 28. These sections are hingedly attached to one another by a pivot or pivots 30, and are stabilized in their connected position by a stabilizer 32.

The rear frame 28 is formed of tubing including spaced horizontally extending lower section 36, which are spaced from one another and like sections 38 are connected with one another by front vertically extending portions 40 and rear vertically extending portions 42. The portions 40 are also connected with the portions 38 by braces 44. As shown in FIG. 8, the lower portions 36 are interconnected by bracing portions 46. A seat 50 rests upon the upper portions 38 and are hinged by pins 52 to the rear of portions 44, whereby the seat may be raised.

A motor 54 is fixed to the frame portions 28 and is herein shown for illustrative purpose only as an internal combustion engine. The drive shaft is shown at 56, the fuel tank at 58, the carburetor at 60, the lever for actuating the throttle valve at 62 and the bowden wire for actuating the lever at 64. A spring 66 normally maintains the throttle valve in the closed position.

A pair of upright bearing supports 70 are also carried by the lower portions 36 of the frame 28 and are disposed rearwardly of the motor 54. These bearing supports carry a shaft 72 whose axis is parallel with the axis of the engine drive shaft 56. The shaft 56 drives a speed control clutch 74 which in turn drives a pulley 76 which is rotatably mounted on the shaft 56. The pulley 76 is connected by a belt 78 with a pulley 80 which is fixed to the shaft 72. When the motor 54 is driven at a certain speed and above that certain speed, the pulley 80 is rotated.

Lever means in the form of two levers 84 are pivotally mounted on the shaft 72. These levers 84 extend rearwardly and carry an axle 86 of a wheel 88, the axis of which lies parallelly with that of the shaft 56 of the motor. As is seen more clearly in FIGS. 6 and 7, the wheel includes a tooth gear 90, which is connected by a chain 92 to a gear 94 which is fixed to the shaft 72. It will be seen from the foregoing, that when the engine is operated at or above the predetermined speed, the wheel 88 will be driven to cause forward movement of the vehicle, when the frame is locked in the position shown in FIGS. 1 and 6. The braking mechanism is shown generally at 98, which is operated by a lever 100 from a bowden wire 102 which is carried by a bracket 104 on one of the levers 84.

The rear frame 28 together with the motor 54, and the seat 50 are locked in elevated position by a pair of arms 108, which are connected to the rear ends of levers 84 by pivot pins 110. Two spring retainers 112 are provided for coil springs 114. Each retainer includes a cylinder 116, which receives a plunger 118. The springs are interposed between the tops of plungers 118 and abutments (not shown) in the upper part of the cylinders 116. The upper parts of the cylinders 116 are pivotally connected by pins 120, in any suitable manner, to the rear portions 42 of the frame. The lower parts of the plungers 118 are connected by pins 122 to the arms 108. Each of the arms 108 is provided with an abutment 124 which when the frame is in the position shown in FIGS. 1 and 6 rests upon a lever 84. It will be observed from FIG. 6 that the pivot pins 122 are in an overcenter position, when the arms 108 are in frame elevating position, i.e., the pivots 122 lie forwardly of a line intersection pivot pins 120 and 110. As shown in FIG. 6, the arms 108 must be moved a considerable distance counterclockwise before pivot pins 122 are moved rearwardly beyond the aforesaid line. Thus, stability is assured. However, to further assure the stability two springs 126 are provided for resiliently retaining the arm 108 and the spring guide 112 in the position shown in FIGS. 1 and 6. Each of the springs 126 is connected at one end to a lever 84 and the other end is connected to the pivot 122. From the foregoing, it will be seen that with the arms 108 and the spring guide 112 in the position shown in FIGS. 1 and 6, the springs 114 form shock absorbers since they resiliently support the rear end of the frame 28.

When it is desired to lower the rear frame 28, the arms 108 are moved counterclockwise (as viewed in FIG. 6) approximately 180° i.e., to the position shown in FIG. 7. At this time the entire rear wheel will be confined within the frame 28, as shown in FIG. 7. It is also apparent from FIG. 7 that when the rear wheel is confined within the frame 28, the pivot pin 110, which connects the lever 84 with the arms 108, is in toggled relationship with respect to the pivot pins 120 and 122 whereby the rear wheel is held in position within the confines of the frame.

Referring now to FIGS. 1, 2, 4 and 5, the front frame 26 includes opposite frame portions 130, the rear ends of which are pivoted to the front ends of portions 28 of the rear frame. These portions 130 are bridged by a footboard 132. The frame 26 also includes upright portions 134 and 136, which support a vertically extending bearing 138 and a central portion 140. This central portion includes a rearwardly extending boss 142 for supporting a pivot pin 144 for the stabilizer 32.

Referring to FIG. 5, it will be seen that the rear end of the stabilizer 32 is connected to a brace 146 which spans the uprights 40 of the rear frame. This connection includes a threaded stud 148, which is welded to the brace 146 and this stud 148 receives an internally threaded nut 150. The nut 150 includes a circular inwardly extending flange 152, which surrounds the stabilizer rod 154 having a collar 156 interposed between the flange 152 and the outer end of the nut 150. A coil spring 158 surrounds a shaft 154 and is interposed between the front of the nut 150 and a fixed collar 160 on the rod 154. The purpose of this spring is to hold the flanges 152 and 156 in contact with one another, when the stabilizer is disconnected from the stud 148 so as to prevent rattling. By tighting the nut 150 on the stud 156, the upper part of the front frame 26 is rigidly connected with the upper part of the rear frame 28.

A front wheel fork and wheel assembly 164 includes a fork 166, which rotatably carries an axle 168 of the wheel 170. The assembly also includes a spindle 172 which is journaled in the usual manner in the bearing 138. The spindle is removably splined to a head 174 and fixed thereto by a screw 176, which is locked in position by a nut 178. By turning the head 174 the front wheel is also turned through the spindle 172.

The head 174 includes two vertically extending sleeves 182, each having a notch 184 and a longitudinally extending groove 186. This groove extends completely longitudinally through the sleeve. The front section includes two handle bars 188 including upwardly extending portions 190 and outwardly extending portions 192. The upright portion 190, each include a pin 194 which rest snugly within the socket 184 so as to provide driving connection between the handle bars and the sleeves 182 and consequently impart oscillating movement by the bar to the front wheel through the spindle. The pins 194 are resiliently held in the sockets 184, by springs 196 which are interposed between the bottom of the sleeve and pins extending through the lower ends of the upright portions 190 of the bars.

The usual encasement for bowden wires, for controlling the brake and controlling the accelerator, are shown as attached to the handle bars.

When it is desirable to dismantle the motor vehicle, the handle bars 188 are pulled upwardly so that the pins 194 can be pulled out of the sockets 184, and then the left handle bar (as shown in FIGS. 2 and 4) is moved clockwise so that the pin registers with the groove 186, as shown in these two Figures in dotted lines, whereby the handle bars can be lowered, the pin passing through the groove. Like movement is imparted to the right handle bar, but it is moved in a counterclockwise direction, as shown in dotted lines. The handle bars can be lowered to the position shown in dotted lines in FIG. 2. Thereafter, the lock nut 178 is released and the screw 176 is actuated to release the head 174 from the spindle 172, whereby the fork and wheel can be withdrawn from the bearing 138.

The dimensions of the rear frame are such that the handle bars and the head 174, as a unit, and the front fork assembly including the wheel 170 can be stored in that frame as is shown in FIGS. 9 and 10.

Preferably a casing 200 is provided for the disassembled unit, the same thing shown in FIG. 11. Zipper 202 and straps 204 are provided This casing is provided also with handles 206.

From the foregoing, it is seen that I have provided a portable motor-vehicle of the type that is sufficiently compactible and of such weight that a man can carry the same. The attaching of the rear wheel 88 to the rear frame 36 by the levers 84, the providing of the spring guide mechanism 112 and the connection thereof through the arms 108 to the levers 84, provide a shock absorber between the rear wheel and the frame, and in addition provide for readily lowering of the rear frame by merely rotating the arms 108 approximately 180°.

Wide handle bars are made possible by the collapsing feature illustrated.

Having described my invention, I claim:

1. A portable motor-vehicle, comprising in combination:
   A. a frame;
   B. a vertically extending bearing carried by the frame;
   C. a spindle journaled in the bearing;
   D. a front wheel journaled on the spindle;
   E. means for turning the spindle in the bearing including:
      1. a sleeve on the spindle, said sleeve having:
         a. a socket,
         b. a longitudinally extending groove in the sleeve,
      2. means for removably securing the sleeve to the spindle,
      3. a handle bar extending into the sleeve and having:
         a. a pin attached thereto, said pin being adapted to be received by the socket and adapted to be moved from the socket into the groove.

2. A portable motor-vehicle as defined in claim 1, characterized in that the socket is in the top of the sleeve.

3. A portable motor-vehicle as defined in claim 1, characterized to include:
   F. means for retaining the pin in the socket.

4. A portable motor-vehicle as defined in claim 1, characterized in that the means (E) comprises:
   E.
      3. a second sleeve on the spindle, said sleeve having:
         a. a socket,
         b. a longitudinally extending groove in the sleeve,
      4. a handle bar extending into the sleeve and having:
         a. a pin attached thereto, said pin being adapted to be received by the socket and adapted to be moved from the socket into the groove.

5. A portable motor vehicle as defined in claim 1, characterized in that the groove extends throughout the length of the sleeve.

6. A portable motor-vehicle, comprising in combination:
   A. a frame;
   B. a vertically extending bearing carried by the frame;
   C. a spindle journaled in the bearing;
   D. a front wheel journaled on the spindle;
   E. means for turning the spindle in the bearing including:
      1. a sleeve on the spindle, said sleeve having:
         a. a socket,
         b. a longitudinally extending groove in the sleeve,
         c. a head,
      2. means for removably fixing the head to the spindle,
      3. a handle bar extending into the sleeve and having:
         a. a pin attached thereto, said pin being adapted to be received by the socket and adapted to be moved from the socket into the groove.

7. A portable motor-vehicle, comprising in combination:
   A. a frame;
   B. a vertically extending bearing carried by the frame;
   C. a spindle journaled in in bearing;
   D. a front wheel journaled on the spindle;
   E. means for turning the spindle in the bearing including:
      1. a sleeve on the spindle, said sleeve having:
         A. a socket,
         B. a longitudinally extending groove in the sleeve.
      2. a handle bar extending into the sleeve and having:
         a. a pin attached thereto, said pin being adapted to be received by the socket and adapted to be moved from the socket into the groove;
   F. spring means for retaining the pin in the socket.

8. A portable motor-vehicle, comprising in combination:

A. a frame;
B. a vertically extending bearing carried by the frame;
C. a spindle journaled in the bearing;
D. a front wheel journaled on the spindle;
E. means for turning the spindle in the bearing including:
 1. a plurality of sleeves on the spindle, each of said sleeves having:
    a. sockets in the tops of the sleeves,
    b. longitudinally extending grooves in the sleeves,
 2. handle bars, one of said bars extending into one of the sleeves, the other of said bars extending into the other sleeve, each of the bars having a pin adapted to be received respectively by the sockets and into the grooves;
F. springs abutting, respectively, the undersides of the sleeves and normally urging the handle bars downwardly.

* * * * *